United States Patent
Chen

(10) Patent No.: US 11,916,853 B2
(45) Date of Patent: Feb. 27, 2024

(54) GROUP TYPE IDENTIFICATION METHOD AND APPARATUS, COMPUTER DEVICE, AND MEDIUM

(71) Applicant: Tencent Technology (Shenzhen) Company Limited, Shenzhen (CN)

(72) Inventor: Hao Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 24 days.

(21) Appl. No.: 17/963,919

(22) Filed: Oct. 11, 2022

(65) Prior Publication Data

US 2023/0031045 A1    Feb. 2, 2023

Related U.S. Application Data

(63) Continuation of application No. PCT/CN2021/141553, filed on Dec. 27, 2021.

(30) Foreign Application Priority Data

Jan. 4, 2021    (CN) .......................... 202110002127.7

(51) Int. Cl.
*G06F 15/16*    (2006.01)
*H04L 51/04*    (2022.01)

(52) U.S. Cl.
CPC .................................... *H04L 51/04* (2013.01)

(58) Field of Classification Search
CPC ....... H04L 51/04; H04L 12/185; H04L 51/52; G06F 16/9536; G06F 18/00; G06F 18/253
See application file for complete search history.

(56) References Cited

U.S. PATENT DOCUMENTS 10,305,758 B1 * 5/2019 Bhide ................. G06F 11/3409
10,805,257 B2 * 10/2020 Yao ......................... G06Q 50/01
(Continued)

FOREIGN PATENT DOCUMENTS

| CN | 107770049 A | 3/2018 |
| CN | 110083791 A | 8/2019 |
| CN | 111738628 A | 10/2020 |

OTHER PUBLICATIONS

Tencent Technology, ISR, PCT/CN2021/141553, dated Mar. 29, 2022, 2 pgs.

(Continued)

*Primary Examiner* — John B Walsh
(74) *Attorney, Agent, or Firm* — Morgan, Lewis & Bockius LLP

(57) ABSTRACT

This application discloses a group type identification method and apparatus, a computer device, and a medium, and belongs to the field of computer technologies. A computer device acquires a first graph structure feature of a first target graph and first user features of a plurality of first user nodes in the first target graph; acquires an attention parameter of each first user node based on the first graph structure feature and the plurality of first user features; selects a plurality of second user nodes from the plurality of first user nodes; identifies a group type of the target group based on first user features of the plurality of second user nodes and a second graph structure feature of a second target graph, so that the target group is identified according to a user feature of a selected important user node and the graph structure feature, thereby improving identification accuracy.

20 Claims, 6 Drawing Sheets

(56) References Cited

U.S. PATENT DOCUMENTS

2017/0235812 A1   8/2017  Gong
2019/0361868 A1*  11/2019  Rogynskyy ............. G06N 7/02

OTHER PUBLICATIONS

Tencent Technology, WO, PCT/CN2021/141553, dated Ma. 29, 2022, 3 pgs.
Tencent Technology, IPRP, PCT/CN2021/141553, dated Jul. 4, 2023, 4 pgs.

\* cited by examiner

GROUP TYPE IDENTIFICATION METHOD AND APPARATUS, COMPUTER DEVICE, AND MEDIUM

CROSS-REFERENCE TO RELATED APPLICATIONS

This application is a continuation application of PCT Patent Application No. PCT/CN2021/141553, entitled "GROUP TYPE IDENTIFICATION METHOD AND APPARATUS, COMPUTER DEVICE, AND MEDIUM" filed on Dec. 27, 2021, which claims priority to Chinese Patent Application No. 202110002127.7, filed with the State Intellectual Property Office of the People's Republic of China on Jan. 4, 2021, and entitled "GROUP TYPE IDENTIFICATION METHOD AND APPARATUS, COMPUTER DEVICE, AND MEDIUM", all of which are incorporated herein by reference in their entirety.

FIELD OF THE TECHNOLOGY

Embodiments of this application relate to the field of computer technologies, and in particular, to a group type identification method and apparatus, a computer device, and a medium.

BACKGROUND OF THE DISCLOSURE

With development of a computer technology and an instant messaging application, a plurality of types of groups can be established based on the instant messaging application. How to identify a group type has become an urgent technical problem to be solved.

SUMMARY

Embodiments of this application provide a group type identification method and apparatus, a computer device, and a medium, to improve accuracy of group type identification. The technical solutions are as follows.

According to one aspect, a group type identification method is provided, where the method includes:
  acquiring a first graph structure feature of a first target graph and first user features of a plurality of first user nodes in the first target graph, the first user node being a node corresponding to a user identifier in a target group, and the first target graph being constructed according to association relationships between the plurality of first user nodes;
  acquiring an attention parameter of each first user node based on the first graph structure feature and the plurality of first user features, the attention parameter representing importance of the first user node in the first target graph;
  selecting a plurality of second user nodes from the plurality of first user nodes, attention parameters of the plurality of second user nodes being greater than an attention parameter of an unselected first user node; and
  identifying a group type of the target group based on first user features of the plurality of second user nodes and a second graph structure feature of a second target graph, the second target graph being constructed according to association relationships between the plurality of second user nodes.

According to another aspect, a group type identification apparatus is provided, where the apparatus includes:
  a feature acquiring module, configured to acquire a first graph structure feature of a first target graph and first user features of a plurality of first user nodes in the first target graph, the first user node being a node corresponding to a user identifier in a target group, and the first target graph being constructed according to association relationships between the plurality of first user nodes;
  a first attention acquiring module, configured to acquire an attention parameter of each first user node in the first target graph based on the first graph structure feature and the plurality of first user features, the attention parameter representing importance of the first user node in the first target graph;
  a first screening module, configured to select a plurality of second user nodes from the plurality of first user nodes, attention parameters of the plurality of second user nodes being greater than an attention parameter of an unselected first user node; and
  a type identification module, configured to identify a group type of the target group based on first user features of the plurality of second user nodes and a second graph structure feature of a second target graph, the second target graph being constructed according to association relationships between the plurality of second user nodes.

In an implementation, the apparatus further includes:
  a feature adjustment module, configured to adjust the first user features of the plurality of second user nodes based on the second graph structure feature to obtain second user features of the plurality of second user nodes;
  a second attention acquiring module, configured to acquire an attention parameter of each second user node in the second target graph based on the second graph structure feature and the plurality of second user features; and
  a second screening module, configured to select a plurality of third user nodes from the plurality of second user nodes, attention parameters of the plurality of third user nodes being greater than an attention parameter of an unselected second user node.

In another implementation, the type identification module is configured to identify the group type of the target group based on the first user features of the plurality of second user nodes, the second graph structure feature, second user features of the plurality of third user nodes, and a third graph structure feature of a third target graph, the third target graph being constructed according to association relationships between the plurality of third user nodes.

In another implementation, the type identification module includes:
  a first fusion unit, configured to fuse the first user features of the plurality of second user nodes with the second graph structure features to obtain a first fusion feature;
  a second fusion unit, configured to fuse the second user features of the plurality of third user nodes with the third graph structure features to obtain a second fusion feature; and
  a type identification unit, configured to identify the group type of the target group based on the first fusion feature and the second fusion feature.

In another implementation, the first fusion unit is configured to:
  calculate an average value according to a quantity of second user nodes and based on the first user features of the plurality of second user nodes and the second graph structure feature, to obtain an average user feature; and
  splice the average user feature and a maximum user feature of the first user features of the plurality of second user nodes to obtain the first fusion feature.

In another implementation, the type identification unit is configured to:

splice the first fusion feature and the second fusion feature to obtain a splicing feature corresponding to the target group; and identify the group type of the target group based on the splicing feature.

In another implementation, the group type identification model includes a first attention network, a first screening network, and an identification network;

the first attention acquiring module is configured to invoke the first attention network to acquire the attention parameter of each first user node in the first target graph based on the first graph structure feature and the plurality of first user features;

the first screening module is configured to invoke the first screening network to select the plurality of second user nodes from the plurality of first user nodes; and the type identification module is configured to invoke the identification network to identify the group type of the target group based on the first user features of the plurality of second user nodes and the second graph structure feature.

In another implementation, the group type identification model further includes a first convolutional network, a second attention network, and a second screening network, and the apparatus further includes:

a feature adjustment module, configured to invoke the first convolutional network to adjust the first user features of the plurality of second user nodes based on the second graph structure feature to obtain second user features of the plurality of second user nodes;

a second attention acquiring module, configured to invoke the second attention network to acquire an attention parameter of each second user node in the second target graph based on the second graph structure feature and the plurality of second user features; and a second screening module, configured to invoke the second screening network, to select a plurality of third user nodes from the plurality of second user nodes, attention parameters of the plurality of third user nodes being greater than an attention parameter of an unselected second user node.

In another implementation, the type identification module is configured to: invoke the identification network to identify the group type of the target group based on the first user features of the plurality of second user nodes, the second graph structure feature, second user features of the plurality of third user nodes, and a third graph structure feature of a third target graph, the third target graph being constructed according to association relationships between the plurality of third user nodes.

In another implementation, the group type identification model further includes a first fusion network and a second fusion network, and the type identification module includes:

a first fusion unit, configured to invoke the first fusion network to fuse the first user features of the plurality of second user nodes with the second graph structure features to obtain a first fusion feature;

a second fusion unit, configured to invoke the second convergence network to fuse the second user features of the plurality of third user nodes with the third graph structure features to obtain a second fusion feature; and a type identification unit, configured to invoke the identification network to identify the group type of the target group based on the first fusion feature and the second fusion feature.

In another implementation, the group type identification model further includes a splicing network, and the type identification unit is configured to:

invoke the splicing network to splice the first fusion feature and the second fusion feature to obtain a splicing feature corresponding to the target group; and invoke the identification network to identify the group type of the target group based on the splicing feature.

In another implementation, a training process of the group type identification model includes:

acquiring a sample type of a sample group, a sample graph structure feature of a sample graph, and sample user features of a plurality of sample user nodes in a sample target graph, the sample user node being a node corresponding to a sample user identifier, and the sample graph being constructed according to association relationships between a plurality of sample user identifiers in the sample group;

invoking the group type identification model to identify a prediction type of the sample group based on the sample graph structure feature and the sample user features of the plurality of sample user nodes; and training the group type identification model according to a difference between the sample type and the prediction type.

In another implementation, the first screening network is configured to:

multiply a quantity of the plurality of first user nodes by a reference ratio to obtain a reference quantity; and arrange attention parameters of the plurality of first user nodes in descending order, select a reference quantity of attention parameters that are arranged in the front, and use first user nodes corresponding to the selected attention parameters as the second user nodes.

In another implementation, the graph structure feature includes an association degree between any two of the plurality of user nodes, and the feature acquiring module is configured to:

acquire a quantity of times that any two user identifiers in the target group appear together, the quantity of times of co-appearance being a quantity of times that content is jointly published in the target group based on the any two user identifiers in a plurality of reference time periods; and determine an association degree between the any two user identifiers based on the quantity of times of co-appearance, the association degree being in a positive correlation with the quantity of times of co-appearance.

In another implementation, the user feature includes a user behavior feature and a user attribute feature, and the feature acquiring module is configured to:

acquire a user social network, the user social network including a plurality of registered user identifiers;

acquire user behavior features of the plurality of user identifiers according to the user social network; and acquire user attribute features of the plurality of user identifiers according to user portrait information corresponding to the plurality of user identifiers.

According to another aspect, a computer device is provided, including a processor and a memory, the memory storing at least one computer program, the at least one computer program being loaded and executed by the processor to implement operations performed in the group type identification method according to the foregoing aspect.

According to another aspect, a computer-readable storage medium is provided, storing at least one computer program, the at least one computer program being loaded and executed by a processor to implement operations performed in the group type identification method according to the foregoing aspects.

According to another aspect, a computer program product or a computer program is further provided, the computer program product or the computer program including a computer program code, the computer program code being stored in a computer-readable storage medium, a processor of a computer device reading the computer program code from the computer-readable storage medium, and the processor executing the computer program code, to cause the computer device to implement operations performed in the group type identification method according to the foregoing aspects.

The technical solutions provided in the embodiments of this application achieve at least the following beneficial effects:

According to the method provided in the embodiments of this application, when an attention parameter of each first user node is acquired, a graph structure feature and a user node feature are considered, and compared with acquiring only user information in the related art, an amount of information is increased, so that the obtained attention parameter can more accurately reflect importance of a user node in a graph structure. Therefore, when a plurality of first user nodes are screened according to a reference attention parameter, relatively important user nodes can be accurately selected, and a type of a target group is identified according to user features of these important user nodes and the graph structure feature, so as to improve identification accuracy, and discard an unimportant user node, thereby reducing an amount of processed data and increasing a processing speed.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from the accompanying drawings without creative efforts.

DESCRIPTION OF EMBODIMENTS

Figure 1:
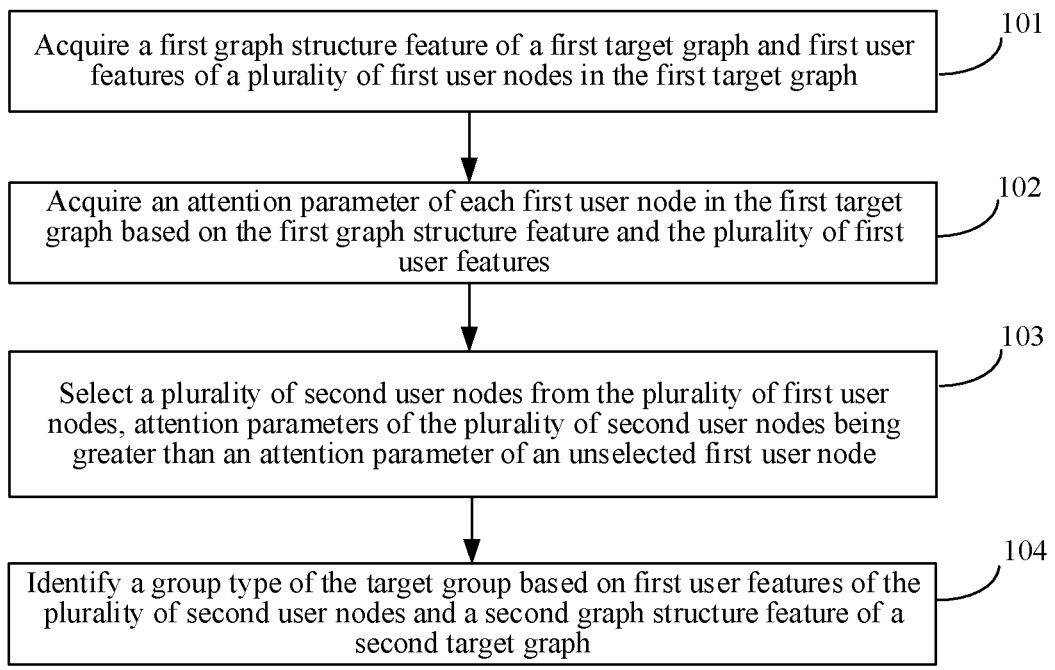
FIG. 1 is a flowchart of a group type identification method according to an embodiment of this application.

To make objectives, technical solutions, and advantages of the embodiments of this application clearer, the following further describes in detail implementations of this application with reference to the accompanying drawings.

It may be understood that the terms "first", "second", and the like used in this application may be used for describing various concepts in this specification. However, the concepts are not limited by the terms unless otherwise specified. The terms are merely used for distinguishing one concept from another concept. For example, in a case not departing from the scope of the present disclosure, a first user node may be referred to as a second user node, and similarly, a second user node may be referred to as a first user node.

For the terms "at least one", "a plurality of", "each", and "any" used in this application, "at least one" refers to "one", "two", or "more", "a plurality of" refers to "two" or "more", "each" refers to "each of a plurality of corresponding", and "any" refers to "any one of a plurality of". For example, when "a plurality of user nodes" refers to "three user nodes", "each" refers to "each of the three user nodes", and "any" refers to "any one of the three user nodes", that is, may be the first user node, the second user node, or the third user node.

In the related art, a type of a group is determined according to user information corresponding to a plurality of user identifiers in the group. The user information includes information such as a user profile photo, a user label, an age, and a gender. However, in this manner of determining a group type based on user information, a data amount based on is relatively small, and consequently, accuracy of a determined group type is relatively low.

A group type identification method provided in the embodiments of this application is applied to a group type identification scenario. For example, in an instant messaging application, for consideration of user privacy and user property security, the group type identification method provided in the embodiments of this application is used for identifying whether a target group is a specific group. If it is determined that the target group is a specific group, group blocking processing or other processing is performed on the target group, so as to avoid causing a loss to the user.

The method provided in the embodiments of this application is performed by a computer device, and the computer device is a terminal or a server. In some embodiments, the terminal is a portable terminal, a pocket-size terminal, a handheld terminal, or the like, for example, a mobile phone, a computer, a tablet computer, or the like. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

FIG. 1 is a flowchart of a group type identification method according to an embodiment of this application. This embodiment of this application is performed by a computer device. Referring to FIG. 1, the method includes the following operations:

101. Acquire a first graph structure feature of a first target graph and first user features of a plurality of first user nodes in the first target graph.

In this embodiment of this application, a target group including a plurality of user identifiers is used as an example for description.

The first user node is a node corresponding to a user identifier in the target group, and the first target graph is constructed according to association relationships between the plurality of first user nodes.

In an implementation, when the plurality of first user nodes are user nodes corresponding to all user identifiers in the target group, that is, the plurality of first user nodes are not screened, the first target graph is an initial target graph. When the plurality of first user nodes are user nodes corresponding to some user identifiers in the target group, that is, the plurality of first user nodes are already obtained after screening, the first target graph is a target graph obtained after screening.

The first graph structure feature is used for describing the first target graph, the first target graph includes a plurality of first user nodes and connection lines between the plurality of first user nodes, and a connection line between any two first user nodes indicates that there is an association relationship between the any two first user nodes. The first user feature is used for describing a user corresponding to a user identifier, and the first user feature includes at least one of a user behavior feature or a user attribute feature.

102. Acquire an attention parameter of each first user node in the first target graph based on the first graph structure feature and the plurality of first user features.

The attention parameter represents importance of the first user node in the first target graph, that is, represents importance of a user identifier corresponding to the first user node in the target group. The importance of the user identifier in the target group is positively correlated with the attention parameter. For example, a user such as a group owner or administrator in the target group is relatively important in the target group, and attention parameters of user nodes corresponding to these users are also relatively large.

103. Select a plurality of second user nodes from the plurality of first user nodes, attention parameters of the plurality of second user nodes being greater than an attention parameter of an unselected first user node.

In this embodiment of this application, a plurality of first user nodes are screened, a plurality of second user nodes with a relatively large attention parameter are selected from the plurality of first user nodes, and subsequently processing is performed according to the second user nodes with a relatively large attention parameter, so that some unimportant information is discarded in a processing process, thereby ensuring that a data amount is reduced, and a loss to important information is reduced.

104. Identify a group type of the target group based on first user features of the plurality of second user nodes and a second graph structure feature of a second target graph.

The second target graph is constructed according to association relationships between the plurality of second user nodes, and the second graph structure feature is used for describing the second target graph. The second target graph is a sub-graph of the first target graph, the second target graph includes a plurality of second user nodes and connection lines between the plurality of second user nodes, and the connection lines between the plurality of second user nodes in the second target graph are the same as connection lines of the plurality of second user nodes in the first target graph.

The group type refers to a type to which the target group belongs. Different group types can be classified according to different division criteria. For example, a working group and a non-working group are classified according to an occupation of a user corresponding to a user identifier in the target group. A home group and a non-home group are classified according to whether a user corresponding to a user identifier in the target group is a relative relationship. A specific group and a non-specific group are classified according to whether behavior of a user corresponding to a user identifier in the target group belongs to specific behavior. For example, the specific behavior includes behavior involving pornography, gambling, fraud, and the like.

According to the method provided in this embodiment of this application, a graph structure feature and a user node feature are considered to acquire an attention parameter of each first user node. Compared with the related art in which only user information is acquired, an amount of information is increased, so that the obtained attention parameter can more accurately reflect importance of a user node in a graph structure. Therefore, when a plurality of first user nodes are screened according to a reference attention parameter, relatively important user nodes can be accurately selected, and a target group is identified according to user features of these important user nodes and the graph structure feature, so as to improve identification accuracy, and reduce a data amount processed increase a processing speed by discarding an unimportant user node.

In an implementation, the computer device invokes a group type identification model to identify the group type of the target group. The following first describes a model structure of the group type identification model.

Figure 2:
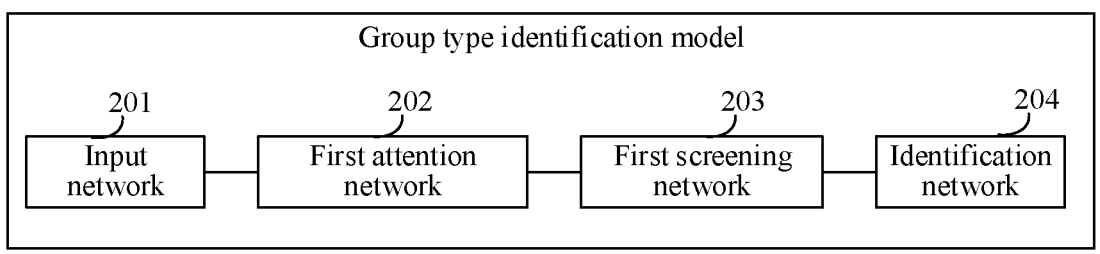
FIG. 2 is a schematic structural diagram of a group type identification model according to an embodiment of this application.

FIG. 2 is a schematic structural diagram of a group type identification model according to an embodiment of this application. Referring to FIG. 2, the group type identification model includes an input network 201, a first attention network 202, a first screening network 203, and an identification network 204. The input network 201 is connected to the first attention network 202, the first attention network 202 is connected to the first screening network 203, and the first screening network 203 is connected to the identification network 204.

The input network 201 is configured to acquire an inputted graph structure feature and user feature, the first attention network 202 is configured to acquire an attention parameter of each user node, the first screening network 203 is configured to select an important user node according to the acquired attention parameter, and the identification network 204 is configured to identify a group type according to a user feature of the selected user node and a corresponding graph structure feature.

Figure 3:
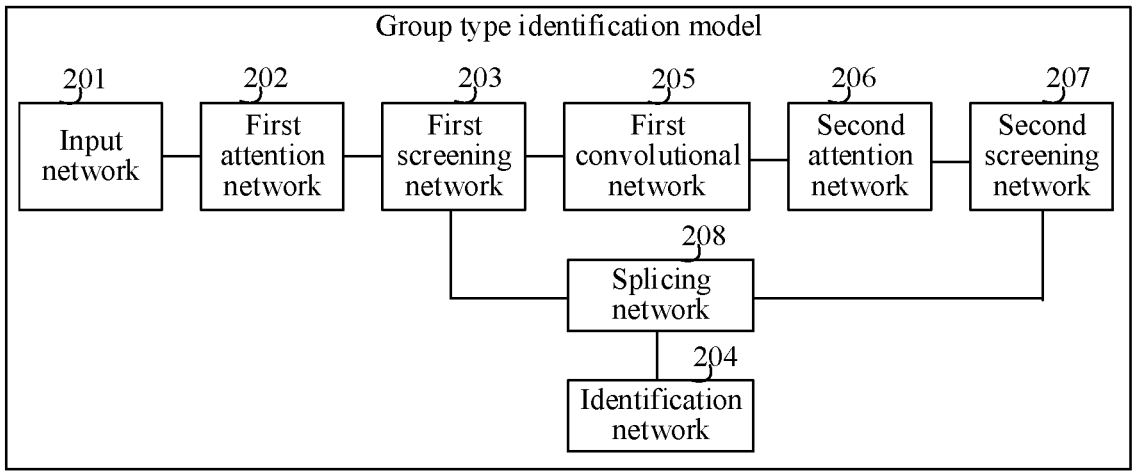
FIG. 3 is a schematic structural diagram of another group type identification model according to an embodiment of this application.

In an implementation, referring to FIG. 3, the group type identification model further includes a first convolutional network 205, a second attention network 206, a second screening network 207, and a splicing network 208. The first convolutional network 205 is connected to the first screening network 203 and the second attention network 206, the second attention network 206 is connected to the second screening network 207, the second screening network 207 is connected to the identification network 204, and the concatenation network 208 is connected to the first screening network 203, the second screening network 207, and the identification network 204.

The first convolutional network 205 is configured to further process a user feature of a relatively important user node selected by the first screening network 203, the second attention network 206 is configured to acquire an attention parameter of each selected user node, the second screening network 207 is configured to further screen the selected user node according to the obtained attention parameter, and the concatenation network 208 is configured to splice a user feature of the user node selected by the first screening network 203 and a user feature of the user node re-selected by the second screening network 207.

Figure 4:
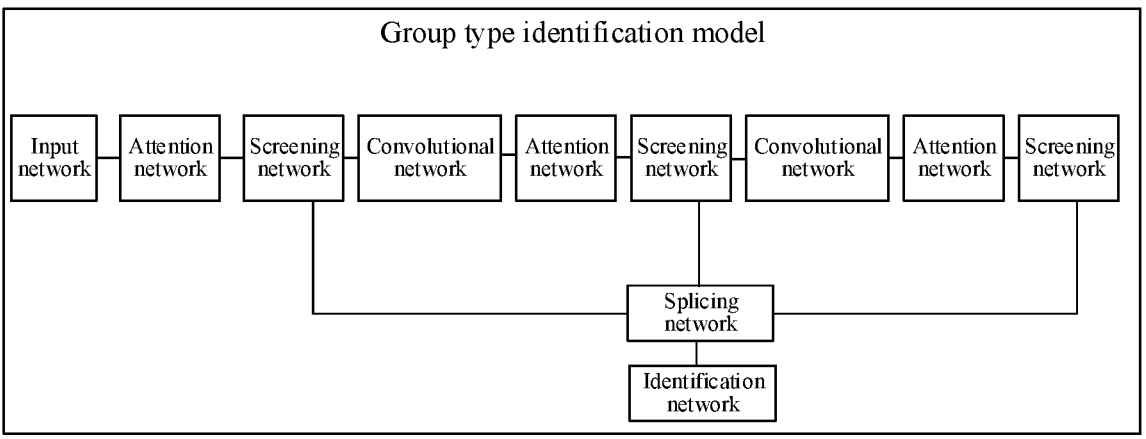
FIG. 4 is a schematic structural diagram of another group type identification model according to an embodiment of this application.

In the foregoing implementation, that user nodes are screened twice is used as an example for description. In another possible implementation, user nodes can be screened three times, four times, or more times, so as to acquire more information. For example, referring to FIG. 4, user nodes are screened three times by using three attention networks and three screening networks. The splicing network is configured to splice user features of user nodes selected by the three screening networks.

In addition, in an implementation, before the first attention network, a convolutional network is further included, that is, convolutional processing is first performed on the inputted user feature and graph structure feature, and the first attention network acquires the attention parameter according to the user feature and the graph structure feature that are obtained after the convolutional processing.

Invoking the group type identification model to identify the type of the target group is described below by using the embodiment shown in FIG. 5.

Figure 5:
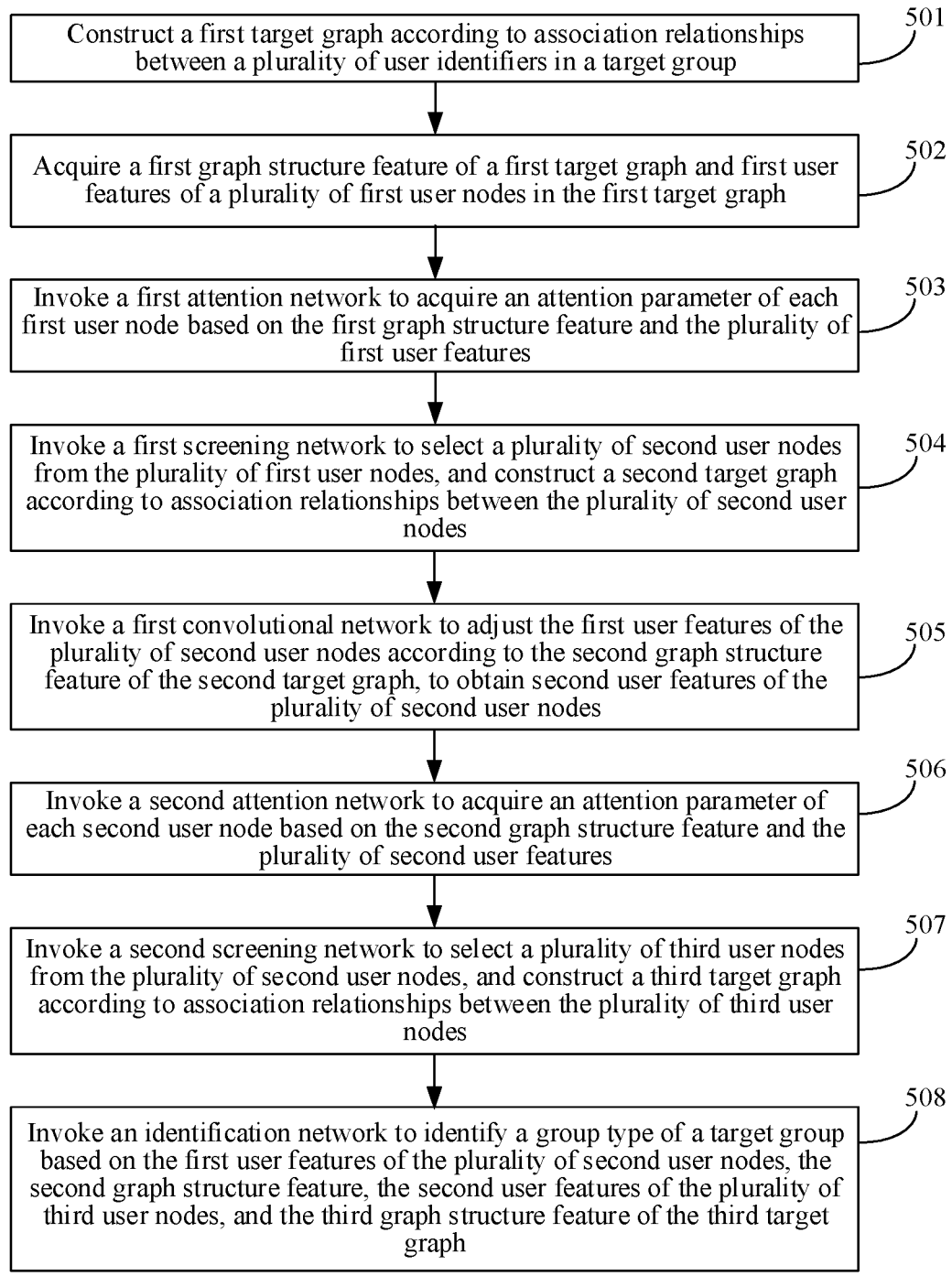
FIG. 5 is a flowchart of another group type identification method according to an embodiment of this application.

FIG. 5 is a flowchart of a group type identification method according to an embodiment of this application. This embodiment of this application is performed by a computer device. Referring to FIG. 5, the method includes the following operations:

501. Construct a first target graph according to association relationships between a plurality of user identifiers in a target group.

In this embodiment of this application, an example in which the first target graph is originally constructed is used for description.

In this embodiment of this application, corresponding user nodes are constructed according to a plurality of user identifiers in a target group, and then the plurality of user nodes are connected together according to association relationships between the plurality of user identifiers to form a first target graph. The first target graph is an isomorphic graph, that is, the first target graph includes only the type of user nodes, and the user nodes are connected according to association relationships of the same type, that is, connection lines in the first target graph are connection lines of the same type.

An association relationship between any two user nodes is determined according to an association degree feature between the any two user nodes, and the association degree feature represents a degree of intimacy between users corresponding to the any two user nodes.

In an implementation, a quantity of co-appearance times of any two user identifiers in the target group is acquired, and an association degree feature between the any two user identifiers is determined according to the quantity of co-appearance times. The association degree feature may be referred to as an association degree, and the quantity of co-appearance times refers to a quantity of times that content is jointly published in the target group based on any two user identifiers in a plurality of reference time periods. The association degree is positively correlated with the quantity of co-appearance times, that is, a larger quantity of co-appearance times leads to a larger association degree between two user identifiers, and a smaller quantity of co-appearance times leads to a smaller association degree between two user identifiers. In some embodiments, the quantity of co-appearance times is directly used as the association degree.

For example, the reference time period is 5 minutes. For any two users, it is determined whether both the two users speak in the target group within 5 minutes. When both the two users speak, a quantity of co-appearance times between the two users increases by 1. When only one user speaks or neither users speak, the quantity of co-appearance times between the two users does not increase. If both the two users speak in the target group, it indicates that there is relatively much communication between the two users, and that the two users are relatively close. Therefore, the association degree can be determined according to the quantity of co-appearance times.

In an implementation, considering that there may be an accidental case in which the two users speak in the target group at the same time, it is further required to determine whether the quantity of co-appearance times is less than a reference quantity, and in response to the fact that the quantity of co-appearance times is less than the reference quantity, the quantity of co-appearance times is set to 0, so as to avoid an accidental case. For example, a group owner in the target group transmits a message, and a user other than the group owner in the target group may reply to the message. In this case, many users in the target group speak at the same time, but a relationship between the users who speak at the same time may not be intimate.

In this embodiment of this application, that the first target graph is an isomorphic graph is only used as an example for description. In another embodiment, the first target graph is an isomeric graph. For example, the first target graph includes user nodes and user type nodes, the user nodes are connected according to association relationships of the same type, and the user nodes are connected to the user type nodes according to types of users corresponding to the user nodes.

502. Acquire a first graph structure feature of a first target graph and first user features of a plurality of first user nodes in the first target graph.

The first graph structure feature represents the plurality of user nodes in the first target graph and association relationships between the plurality of user nodes, and the first graph structure feature includes an association degree between any two user nodes in the plurality of user nodes. The first user feature includes a user behavior feature and a user attribute feature, the user behavior feature represents historical behavior of a user, and the user attribute feature represents an attribute of a user.

In an implementation, a user social network is acquired, and user behavior features of a plurality of user identifiers in a target group are acquired according to the user social network. The user social network includes a plurality of registered user identifiers.

In some embodiments, the user behavior feature of the user identifier is acquired according to the user social network in a graph embedding manner. Graph embedding is used for representing each node in a graph as one dense vector a low-dimensional space, and the obtained dense vector is used as feature information of the node. A core idea of graph embedding is to preserve an intrinsic structure attribute of the graph structure, that is, to keep connected nodes in the graph close to each other in a vector space. For example, a graph embedding method includes a node embedding method such as DeepWalk (a node representation method in a generative network) and Node2Vec (a node vector model in a generative network).

The DeepWalk node embedding method is used as an example. Based on the user social network and starting from each user node in the graph, a plurality of tracks are randomly traveled according to the user social network and a user connection line weight, and all traveled tracks are inputted into a word2vec word vector embedding model as a corpus, and processed by using the word2vec word vector embedding model, to finally obtain a user behavior feature of each user node.

In an implementation, the user attribute features of the plurality of user identifiers in the target group are acquired according to user portrait information corresponding to the plurality of user identifiers in the target group. The user portrait information includes information such as a user profile photo, dynamic messages published by the user, a user age, a gender, and a geographical location of the user.

In an implementation, a vector is used for representing a first user feature, and a matrix is used for representing a plurality of first user features. That is, the plurality of first user features are concatenated together to form a matrix. For example, a row or a column in the matrix represents a first user feature of one first user node.

In an implementation, a matrix is used for representing a first graph structure feature, and an element at each location in the matrix represents an association relationship between two corresponding user nodes. For example, an element in the third row and the fourth column of the matrix represents an association relationship between a third user node and a fourth user node. For example, an association relationship between any two first user nodes is acquired by using the following formula:

$$Aij = \log(C_{ij});$$

$A_{ij}$ represents an association relationship between an $i^{th}$ first user node and a $j^{th}$ user node, and $C_{ij}$ represents a quantity of co-appearance times of a user identifier corresponding to the $i^{th}$ first user node and a user identifier corresponding to the $j^{th}$ user node.

503. Invoke a first attention network to acquire an attention parameter of each first user node based on the first graph structure feature and the plurality of first user features.

The first attention network is at least one graph neural network (GNN). The attention parameter is acquired by using any one of the following formulas:

$$Z = \sigma(GNN(X,A));$$

$$Z = \sigma(GNN(X, A+A^2));$$

$$Z = \sigma(GNN_2(\sigma(GNN_1(X,A)), A));$$

$$Z = \frac{1}{M}\sum_m \sigma(GNN_m(X, A));$$

Z indicates an attention parameter, X indicates a plurality of first user features, A indicates a first graph structure feature, σ is a reference value, GNN(•) indicates convolutional processing on the first user feature and the first graph structure feature, m indicates an $m^{th}$ GNN, and M indicates a quantity of GNNs. Z, X, and A are matrices.

One GNN is used in the foregoing first and second formulas, two GNNs are used in the foregoing third formula, and M GNNs are used in the foregoing fourth formula. In the foregoing third formula, the two GNNs are connected in sequence. That is, the first GNN is used for performing first processing, and the second GNN is used for performing second processing on the basis of the first processing, to obtain an attention parameter. In the foregoing fourth formula, the M GNNs separately process the first user feature and the first graph structure feature, and average M attention parameters obtained through processing, to obtain a final attention parameter.

504. Invoke a first screening network to select a plurality of second user nodes from the plurality of first user nodes, and construct a second target graph according to association relationships between the plurality of second user nodes.

Attention parameters of the plurality of second user nodes are greater than an attention parameter of an unselected first user node.

In an implementation, the first screening network is invoked, a quantity of the plurality of first user nodes is multiplied by a reference ratio, to obtain a reference quantity, attention parameters of the plurality of first user nodes are arranged in descending order, a reference quantity of attention parameters that are arranged in the front are selected, and first user nodes corresponding to the selected attention parameters are used as the second user nodes. After the plurality of second user nodes are selected, the second target graph is formed according to the association relationships between the selected plurality of second user nodes.

In some embodiments, the following formula is used for acquiring the first user features of the plurality of second user nodes and the second graph structure feature of the second target graph:

$$X^l = X_{idx,:}; A^l = A_{idx,idx};$$

$X^l$ represents the first user features of the plurality of second user nodes, $X_{idx,:}$ represents selecting the first user features of the second user nodes from the first user features of the plurality of first user nodes, $A^l$ represents the second graph structure feature, and $A_{idx,idx}$ represents selecting an association relationship corresponding to the plurality of second user nodes from the first graph structure feature.

In some embodiments, considering the size of the attention parameter, the following formula is used for adjusting the first user features of the plurality of second user nodes to obtain adjusted first user features:

$$X^l = X^l \odot Z;$$

$X^l$ represents an adjusted first user feature, Z represents attention parameters of a plurality of second user nodes, ⊙ represents a bitwise product, that is, a first user feature of each second user node is multiplied by an attention parameter.

This embodiment of this application is merely described by using a plurality of times of screening on user nodes as an example. In another embodiment, after a plurality of second user nodes are selected after only one time of screening on user nodes, a group type of a target group is identified based directly on user features of the plurality of second user nodes and a second graph structure feature for constructing a second target graph, and no subsequent operation is performed.

505. Invoke a first convolutional network to adjust the first user features of the plurality of second user nodes according to the second graph structure feature of the second target graph, to obtain second user features of the plurality of second user nodes.

The first convolutional network is a graph convolutional network (GCN), and the following formula is used for determining the second user feature obtained after the convolutional processing:

$$X^{l+1} = \sigma(A^l X^l W^{l+1});$$

$X^{l+1}$ represents second user features of a plurality of second user nodes, $X^l$ represents first user features of a plurality of second user nodes, $A^l$ represents a second graph structure feature, $W^{l+1}$ represents a model parameter in a first convolutional network, and $\sigma$ is a reference value.

506. Invoke a second attention network to acquire an attention parameter of each second user node based on the second graph structure feature and the plurality of second user features.

507. Invoke a second screening network to select a plurality of third user nodes from the plurality of second user nodes, and construct a third target graph according to association relationships between the plurality of third user nodes.

Implementations of steps 506 to 507 are the same as those of steps 503 to 504 described above, and are not described in detail herein again.

508. Invoke an identification network to identify a group type of a target group based on the first user features of the plurality of second user nodes, the second graph structure feature, the second user features of the plurality of third user nodes, and the third graph structure feature of the third target graph.

In an implementation, to reduce a data amount processed by the identification network, the first user features of the plurality of second user nodes and the second graph structure feature are first fused to obtain a first fusion feature. The second user features of the plurality of third user nodes are fused with the third graph structure features to obtain a second fusion feature; and the identification network is invoked to identify the group type of the target group based on the first fusion feature and the second fusion feature.

In an implementation, the first user features of the plurality of second user nodes and the second graph structure feature are averaged according to a quantity of second user nodes, that is, an average value is calculated based on the first user features of the plurality of second user nodes and the second graph structure feature, to obtain an average user feature corresponding to the plurality of second user nodes. The average user feature and a maximum user feature of the first user features of the plurality of second user nodes are spliced to obtain the first fusion feature. The second graph structure feature includes the association relationships between the plurality of second user nodes. For any second user node, an association relationship between the second user node and another second user node can be determined from the second graph structure feature. When the average value is calculated, a first user feature of the second user node and the association relationship between the second user node and another second user node are actually used as a whole, and first user features of a plurality of second user nodes and a plurality of association relationships are averaged.

For example, the first fusion feature is acquired by using the following formula:

$$s = \frac{1}{N}\sum_{i=1}^{N} x_i \| \max_{i=1}^{N} x_i;$$

s represents a first fusion feature, N represents a quantity of second user nodes, $x_i$ represents a first user feature of an $i^{th}$ second user node and an association relationship between the $i^{th}$ second user node and another second user node, and $\|$ represents splicing a feature before $\|$ and a feature after $\|$.

Similarly, for the second user features of the third user nodes and the third graph structure feature, average processing is performed on the second user features of the plurality of third user nodes and the third graph structure feature according to a quantity of third user nodes, that is, an average value is calculated based on the second user features of the plurality of third user nodes and the third graph structure feature, to obtain an average user feature corresponding to the plurality of third user nodes. The average user feature and a maximum user feature of the second user features of the plurality of third user nodes are spliced to obtain the second fusion feature.

In an implementation, the first fusion feature and the second fusion feature are spliced to obtain a splicing feature corresponding to the target group, and the group type corresponding to the target group is identified based on the splicing feature. The splicing feature is a feature that represents the target group.

Figure 6:
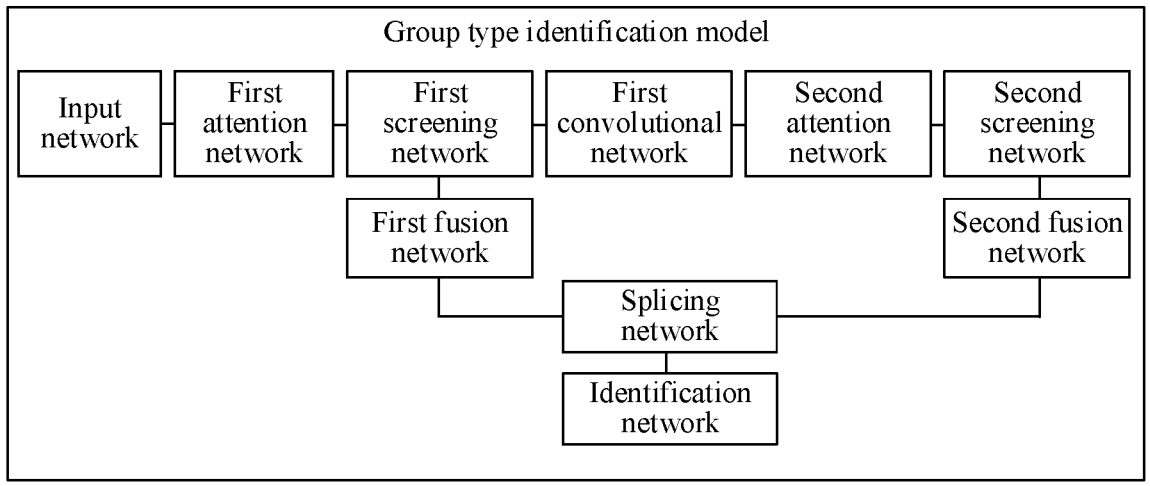
FIG. 6 is a schematic structural diagram of another group type identification model according to an embodiment of this application.

In an implementation, referring to the schematic structural diagram of the model shown in FIG. 6, the group type identification model further includes a first fusion network, a second fusion network, and a splicing network, that is, the first fusion network is invoked to fuse the first user features of plurality of second user nodes and the second graph structure feature to obtain the first fusion feature; the second convergence network is invoked to fuse the second user features of the plurality of third user nodes with the third graph structure features to obtain the second fusion feature; the splicing network is invoked to splice the first fusion feature and the second fusion feature to obtain the splicing feature corresponding to the target group; and the identification network is invoked to identify the group type of the target group based on the splicing feature.

Determining whether the target group is a specific group is used as an example for description. In an implementation, the identification network is a classifier. The classifier includes a multi-layer perceptron, and an output of the identification network is 0 or 1. When the output of the identification network is 0, it indicates that the target group is not a specific group, and when the output of the identification network is 1, it indicates that the target group is a specific group. For example, the following formula is used for determining an output value of the identification network:

$$\hat{Y} = \text{MLP}(E);$$

$\hat{Y}$ indicates an output value of the identification network, E indicates a splicing feature, and MLP(•) indicates that a multi-layer perceptron (MLP) is used for processing the splicing feature.

In another possible implementation, the output of the identification network is a probability. When the outputted probability is greater than a reference probability, it indicates that the target group is a specific group, and when the outputted probability is not greater than the reference probability, it indicates that the target group is not a specific group.

The embodiment shown in FIG. 5 is merely described by using an example of invoking the group type identification model to identify the group type of the target group. In another embodiment, a computer device can directly acquire an attention parameter of each first user node based on a first graph structure feature and a plurality of first user features, select a plurality of second user nodes from a plurality of first user nodes, construct a second target graph according to association relationships between the plurality of second user nodes, adjust first user features of the plurality of second user nodes according to a second graph structure feature of the second target graph, to obtain second user features of the plurality of second user nodes, obtain an attention parameter of each second user node based on the second graph structure feature and the plurality of second user features, select a plurality of third user nodes from the plurality of second user nodes, construct a third target graph according to association relationships between the plurality of third user nodes, and identify a group type of a target group based on the first user features of the plurality of second user nodes, the second graph structure feature, the second user feature of the plurality of third user nodes, and the third graph structure feature of the third target graph.

According to the method provided in the embodiments of this application, when an attention parameter of each first user node is acquired, a graph structure feature and a user node feature are considered, and compared with acquiring only user information in the related art, an amount of information is increased, so that the obtained attention parameter can more accurately reflect importance of a user node in a graph structure. Therefore, when a plurality of first user nodes are screened according to a reference attention parameter, relatively important user nodes can be accurately selected, and a type of a target group is identified according to user features of these important user nodes and the graph structure feature, so as to improve identification accuracy, and discard an unimportant user node, thereby reducing an amount of processed data and increasing a processing speed.

In addition, in this embodiment of this application, user nodes are screened for a plurality of times to obtain user features and graph structure features at different layers. When a target group is identified, the user features and graph structure features at different layers are considered, thereby further improving identification accuracy.

In an implementation, before the group type identification model is used, the group type identification model needs to be trained first, and a training process of the group type identification model includes: acquiring a sample type of a sample group, a sample graph structure feature of a sample graph, and sample user features of a plurality of sample user nodes in a sample target graph; invoking the group type identification model to identify a prediction type of the sample group based on the sample graph structure feature and the sample user features of the plurality of sample user nodes; and training the group type identification model according to a difference between the sample type and the prediction type. The sample user node is a node corresponding to a sample user identifier, and the sample graph is constructed according to association relationships between a plurality of sample user identifiers in the sample group.

For example, a square error is used for training the group type identification model:

$$L_i = (Y - \hat{Y})^2$$

$\hat{Y}$ represents a prediction type, Y represents a sample type, and $L_i$ represents a difference between the prediction type and the sample type.

In some embodiments, after the group type identification model is invoked to identify the group type of the target group, the target group can be used for continuing training the group type identification model.

In the foregoing training process, only one time of training is used as an example, and in another embodiment, a plurality of times of iterative training can be performed on the group type identification model.

In an implementation, for the application scenario of determining whether the target group is a specific group, in the related art, a keyword filtering technology is used for determining whether content published by a user includes a specific word. If the content includes the specific word, it is considered that the target group belongs to the specific group. If the user replaces the corresponding specific word with another unspecified word, the keyword filtering technology cannot detect the target group, and therefore, it cannot be determined whether the word is the specific word, and identification accuracy of the target group is relatively low. In another related art, a user reporting manner is used, that is, after a user reports a target group, a technical person performs manual review to determine whether the target group belongs to a specific group. However, this manner relies on user reporting, and is affected by user reporting behavior, and identification accuracy of the target group is also low. Compared with the foregoing two related art, the manner provided in this embodiment of this application is not affected by a vocabulary used by a user and user reporting behavior, and can directly identify a group type of a target group according to association relationships between a plurality of user nodes in the target group and user features of user nodes, thereby improving identification accuracy.

In another related art, a pooling function is used for reading information of all user nodes in a target group. However, when there are many user nodes, it is difficult to read all information by using the pooling function, which causes a large amount of lost information, and a larger quantity of user nodes leads to a slower processing speed. In this application, user nodes can be screened according to an attention parameter, and only information of the selected user node needs to be read. In addition, information of an important node can be preserved according to a size of the attention parameter, which does not lead to a large amount of lost information, and a processing speed is increased while an amount of information is ensured.

Figure 7:
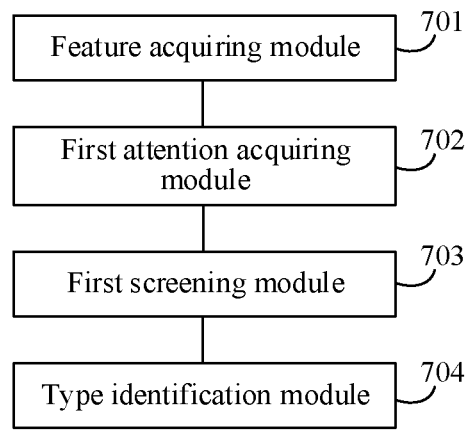
FIG. 7 is a schematic structural diagram of a group type identification apparatus according to an embodiment of this application.

FIG. 7 is a schematic structural diagram of a group type identification apparatus according to an embodiment of this application. Referring to FIG. 7, the apparatus includes:

a feature acquiring module 701, configured to acquire a first graph structure feature of a first target graph and first user features of a plurality of first user nodes in the first target graph, the first user node being a node corresponding to a user identifier in a target group, and the first target graph being constructed according to association relationships between the plurality of first user nodes;

a first attention acquiring module 702, configured to acquire an attention parameter of each first user node in the first target graph based on the first graph structure feature and the plurality of first user features, the attention parameter representing importance of the first user node in the first target graph;

a first screening module 703, configured to select a plurality of second user nodes from the plurality of first user nodes according to the plurality of obtained attention parameters, attention parameters of the plurality of second user nodes being greater than an attention parameter of an unselected first user node; and a type identification module 704, configured to identify a group type of the target group based on first user features of the plurality of second user nodes and a second graph structure feature of a second target graph, the second target graph being constructed according to association relationships between the plurality of second user nodes.

According to the apparatus provided in the embodiments of this application, when an attention parameter of each first user node is acquired, a graph structure feature and a user node feature are considered, and compared with acquiring only user information in the related art, an amount of information is increased, so that the obtained attention parameter can more accurately reflect importance of a user node in a graph structure. Therefore, when a plurality of first user nodes are screened according to a reference attention parameter, relatively important user nodes can be accurately selected, and a type of a target group is identified according to information of these important user nodes, so as to improve identification accuracy, and discard an unimportant user node, thereby reducing an amount of processed data and increasing a processing speed.

Figure 8:
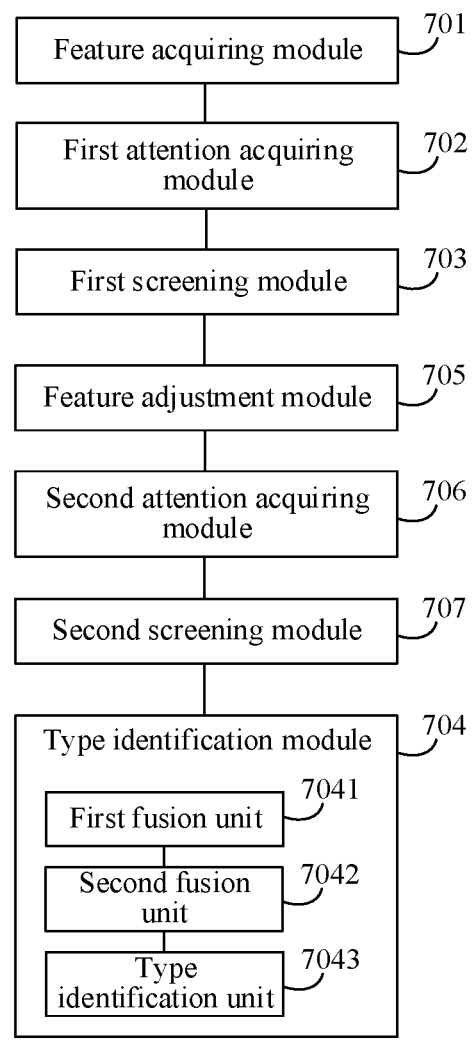
FIG. 8 is a schematic structural diagram of another group type identification apparatus according to an embodiment of this application.

In an implementation, referring to FIG. 8, the apparatus further includes:

a feature adjustment module 705, configured to adjust the first user features of the plurality of second user nodes based on the second graph structure feature to obtain second user features of the plurality of second user nodes;

a second attention acquiring module 706, configured to acquire an attention parameter of each second user node by processing based on the second graph structure feature and the plurality of second user features; and a second screening module 707, configured to select a plurality of third user nodes from the plurality of second user nodes, attention parameters of the plurality of third user nodes being greater than an attention parameter of an unselected second user node.

In another possible implementation, the type identification module 704 is configured to identify the group type of the target group based on the first user features of the plurality of second user nodes, the second graph structure feature, second user features of the plurality of third user nodes, and a third graph structure feature of a third target graph, the third target graph being constructed according to association relationships between the plurality of third user nodes.

In another possible implementation, referring to FIG. 8, the type identification module 704 includes:

a first fusion unit 7041, configured to fuse the first user features of the plurality of second user nodes with the second graph structure features to obtain a first fusion feature;

a second fusion unit 7042, configured to fuse the second user features of the plurality of third user nodes with the third graph structure features to obtain a second fusion feature; and a type identification unit 7043, configured to identify the group type of the target group based on the first fusion feature and the second fusion feature.

In another possible implementation, referring to FIG. 8, the first fusion unit 7041 is configured to:

calculate an average value based on the first user features of the plurality of second user nodes and the second graph structure feature, to obtain an average user feature; and splice the average user feature and a maximum user feature of the first user features of the plurality of second user nodes to obtain the first fusion feature.

In another possible implementation, referring to FIG. 8, the type identification unit 7043 is configured to:

splice the first fusion feature and the second fusion feature to obtain a splicing feature corresponding to the target group; and identify the group type of the target group based on the splicing feature.

In another possible implementation, referring to FIG. 8, the group type identification model includes a first attention network, a first screening network, and an identification network;

the first attention acquiring module 702 is configured to invoke the first attention network to acquire the attention parameter of each first user node based on the first graph structure feature and the plurality of first user features;

the first screening module 703 is configured to invoke the first screening network to select the plurality of second user nodes from the plurality of first user nodes; and the type identification module 704 is configured to invoke the identification network to identify the group type of the target group based on the first user features of the plurality of second user nodes and the second graph structure feature.

In another possible implementation, the group type identification model further includes a first convolutional network, a second attention network, and a second screening network. Referring to FIG. 8, the apparatus further includes:

a feature adjustment module 705, configured to invoke the first convolutional network to adjust the first user features of the plurality of second user nodes based on the second graph structure feature to obtain second user features of the plurality of second user nodes;

a second attention acquiring module 706, configured to invoke the second attention network to acquire an attention parameter of each second user node in the second target graph based on the second graph structure feature and the plurality of second user features; and a second screening module 707, configured to invoke the second screening network, to select a plurality of third user nodes from the plurality of second user nodes, attention parameters of the plurality of third user nodes being greater than an attention parameter of an unselected second user node.

In another possible implementation, the type identification module 704 is configured to: invoke the identification network to identify the group type of the target group based on the first user features of the plurality of second user nodes, the second graph structure feature, second user features of the plurality of third user nodes, and a third graph structure feature of a third target graph, the third target graph being constructed according to association relationships between the plurality of third user nodes.

In another possible implementation, the group type identification model further includes a first fusion network and a second fusion network. Referring to FIG. 8, the type identification module 704 includes:

a first fusion unit 7041, configured to invoke the first fusion network to fuse the first user features of the plurality of second user nodes with the second graph structure features to obtain a first fusion feature;

a second fusion unit 7042, configured to invoke the second convergence network to fuse the second user features of the plurality of third user nodes with the third graph structure features to obtain a second fusion feature; and a type identification unit 7043, configured to invoke the identification network to identify the group type of the target group based on the first fusion feature and the second fusion feature.

In another possible implementation, the group type identification model further includes a splicing network. Referring to FIG. 8, the type identification unit 7043 is configured to:

invoke the splicing network to splice the first fusion feature and the second fusion feature to obtain a splicing feature corresponding to the target group; and invoke the identification network to identify the group type of the target group based on the splicing feature.

In another possible implementation, a training process of the group type identification model includes:

acquiring a sample type of a sample group, a sample graph structure feature of a sample graph, and sample user features of a plurality of sample user nodes in a sample target graph, the sample user node being a node corresponding to a sample user identifier, and the sample graph being constructed according to association relationships between a plurality of sample user identifiers in the sample group;

invoking the group type identification model to identify a prediction type of the sample group based on the sample graph structure feature and the sample user features of the plurality of sample user nodes; and training the group type identification model according to a difference between the sample type and the prediction type.

In another possible implementation, referring to FIG. 8, the first screening network 703 is configured to:

multiply a quantity of the plurality of first user nodes by a reference ratio to obtain a reference quantity; and arrange attention parameters of the plurality of first user nodes in descending order, select a reference quantity of attention parameters that are arranged in the front, and use first user nodes corresponding to the selected attention parameters as the second user nodes.

In another possible implementation, the graph structure feature includes an association degree feature between any two of the plurality of user nodes. Referring to FIG. 8, the feature acquiring module 701 is configured to:

acquire a quantity of times that any two user identifiers in the target group appear together, the quantity of times of co-appearance being a quantity of times that content is jointly published in the target group based on the any two user identifiers in a plurality of reference time periods; and determine an association degree between the any two user identifiers based on the quantity of times of co-appearance, the association degree being in a positive correlation with the quantity of times of co-appearance.

In another possible implementation, the user feature includes a user behavior feature and a user attribute feature. Referring to FIG. 8, the feature acquiring module 701 is configured to:

acquire a user social network, the user social network including a plurality of registered user identifiers;

acquire user behavior features of the plurality of user identifiers according to the user social network; and acquire user attribute features of the plurality of user identifiers according to user portrait information corresponding to the plurality of user identifiers.

All the foregoing technical solutions may be arbitrarily combined to form an embodiment of this application, and details are not described herein again.

When the group type identification apparatus provided in the foregoing embodiments identifies a group type, the division of the foregoing functional modules is merely an example for description. In the practical application, the functions may be assigned to and completed by different functional modules according to the requirements, that is, the internal structure of the computer device is divided into different functional modules, to implement all or some of the functions described above. In addition, the group type identification apparatus and the group type identification method embodiments provided in the foregoing embodiments belong to the same concept. For the specific implementation process, reference may be made to the method embodiments, and details are not described herein again.

The embodiments of this application further provide a computer device, including a processor and a memory, the memory storing at least one computer program, and the at least one computer program being loaded and executed by the processor to implement the following operations:

acquiring a first graph structure feature of a first target graph and first user features of a plurality of first user nodes in the first target graph, the first user node being a node corresponding to a user identifier in a target group, and the first target graph being constructed according to association relationships between the plurality of first user nodes;

acquiring an attention parameter of each first user node based on the first graph structure feature and the plurality of first user features, the attention parameter representing importance of the first user node in the first target graph;

selecting a plurality of second user nodes from the plurality of first user nodes, attention parameters of the plurality of second user nodes being greater than an attention parameter of an unselected first user node; and identifying a group type of the target group based on first user features of the plurality of second user nodes and a second graph structure feature of a second target graph, the second target graph being constructed according to association relationships between the plurality of second user nodes.

In an implementation, the at least one computer program is loaded and executed by the processor, so as to implement the following operations:

adjusting the first user features of the plurality of second user nodes based on the second graph structure feature to obtain second user features of the plurality of second user nodes;

acquiring an attention parameter of each second user node based on the second graph structure feature and the plurality of second user features; and selecting a plurality of third user nodes from the plurality of second user nodes, attention parameters of the plurality of third user nodes being greater than an attention parameter of an unselected second user node.

In an implementation, the at least one computer program is loaded and executed by the processor, so as to implement the following operations:

identifying the group type of the target group based on the first user features of the plurality of second user nodes, the second graph structure feature, second user features of the plurality of third user nodes, and a third graph structure feature of a third target graph, the third target graph being constructed according to association relationships between the plurality of third user nodes.

In an implementation, the at least one computer program is loaded and executed by the processor, so as to implement the following operations:

fusing the first user features of the plurality of second user nodes with the second graph structure features to obtain a first fusion feature;

fusing the second user features of the plurality of third user nodes with the third graph structure features to obtain a second fusion feature; and identifying the group type of the target group based on the first fusion feature and the second fusion feature.

In an implementation, the at least one computer program is loaded and executed by the processor, so as to implement the following operations: calculating an average value based on the first user features of the plurality of second user nodes and the second graph structure feature, to obtain an average user feature; and splicing the average user feature and a maximum user feature of the first user features of the plurality of second user nodes to obtain the first fusion feature.

In an implementation, the at least one computer program is loaded and executed by the processor, so as to implement the following operations:

splicing the first fusion feature and the second fusion feature to obtain a splicing feature corresponding to the target group; and identifying the group type of the target group based on the splicing feature.

In an implementation, the group type identification model includes a first attention network, a first screening network, and an identification network, and the at least one computer program is loaded and executed by the processor, so as to implement the following operations:

invoking the first attention network to acquire the attention parameter of each first user node based on the first graph structure feature and the plurality of first user features;

the selecting a plurality of second user nodes from the plurality of first user nodes includes:

invoking the first screening network to select the plurality of second user nodes from the plurality of first user nodes; and the identifying a group type of the target group based on first user features of the plurality of second user nodes and a second graph structure feature of a second target graph includes:

invoking the identification network to identify the group type of the target group based on the first user features of the plurality of second user nodes and the second graph structure feature.

In an implementation, the group type identification model further includes a first convolutional network, a second attention network, and a second screening network, and the at least one computer program is loaded and executed by the processor, so as to implement the following operations:

invoking the first convolutional network to adjust the first user features of the plurality of second user nodes based on the second graph structure feature to obtain second user features of the plurality of second user nodes;

invoking the second attention network to acquire an attention parameter of each second user node based on the second graph structure feature and the plurality of second user features; and invoking the second screening network, to select a plurality of third user nodes from the plurality of second user nodes, attention parameters of the plurality of third user nodes being greater than an attention parameter of an unselected second user node.

In an implementation, the at least one computer program is loaded and executed by the processor, so as to implement the following operations:

invoking the identification network to identify the group type of the target group based on the first user features of the plurality of second user nodes, the second graph structure feature, second user features of the plurality of third user nodes, and a third graph structure feature of a third target graph, the third target graph being constructed according to association relationships between the plurality of third user nodes.

In an implementation, the group type identification model further includes a first fusion network and a second fusion network, and the at least one computer program is loaded and executed by the processor, so as to implement the following operations:

invoking the first fusion network to fuse the first user features of the plurality of second user nodes with the second graph structure features to obtain a first fusion feature;

invoking the second convergence network to fuse the second user features of the plurality of third user nodes with the third graph structure features to obtain a second fusion feature; and invoking the identification network to identify the group type of the target group based on the first fusion feature and the second fusion feature.

In an implementation, the group type identification model further includes a splicing network, and the at least one computer program is loaded and executed by the processor, so as to implement the following operations:

invoking the splicing network to splice the first fusion feature and the second fusion feature to obtain a splicing feature corresponding to the target group; and invoking the identification network to identify the group type of the target group based on the splicing feature.

In an implementation, the at least one computer program is loaded and executed by the processor, so as to implement the following operations:

acquiring a sample type of a sample group, a sample graph structure feature of a sample graph, and sample user features of a plurality of sample user nodes in a sample target graph, the sample user node being a node corresponding to a sample user identifier, and the sample graph being constructed according to association relationships between a plurality of sample user identifiers in the sample group;

invoking the group type identification model to identify a prediction type of the sample group based on the sample graph structure feature and the sample user features of the plurality of sample user nodes; and training the group type identification model according to a difference between the sample type and the prediction type.

In an implementation, the graph structure feature includes an association degree between any two of the plurality of user nodes, and the at least one computer program is loaded and executed by the processor, so as to implement the following operations:

acquiring a quantity of times that any two user identifiers in the target group appear together, the quantity of times of co-appearance being a quantity of times that content is jointly published in the target group based on the any two user identifiers in a plurality of reference time periods; and determining an association degree between the any two user identifiers based on the quantity of times of co-appearance, the association degree being in a positive correlation with the quantity of times of co-appearance.

In an implementation, the at least one computer program is loaded and executed by the processor, so as to implement the following operations:

multiplying a quantity of the plurality of first user nodes by a reference ratio to obtain a reference quantity; and arranging attention parameters of the plurality of first user nodes in descending order, selecting a reference quantity of attention parameters that are arranged in the front, and using first user nodes corresponding to the selected attention parameters as the second user nodes.

In an implementation, the user feature includes a user behavior feature and a user attribute feature, and the at least one computer program is loaded and executed by the processor, so as to implement the following operations:

acquiring a user social network, the user social network including a plurality of registered user identifiers;

acquiring user behavior features of the plurality of user identifiers according to the user social network; and acquiring user attribute features of the plurality of user identifiers according to user portrait information corresponding to the plurality of user identifiers.

Figure 9:
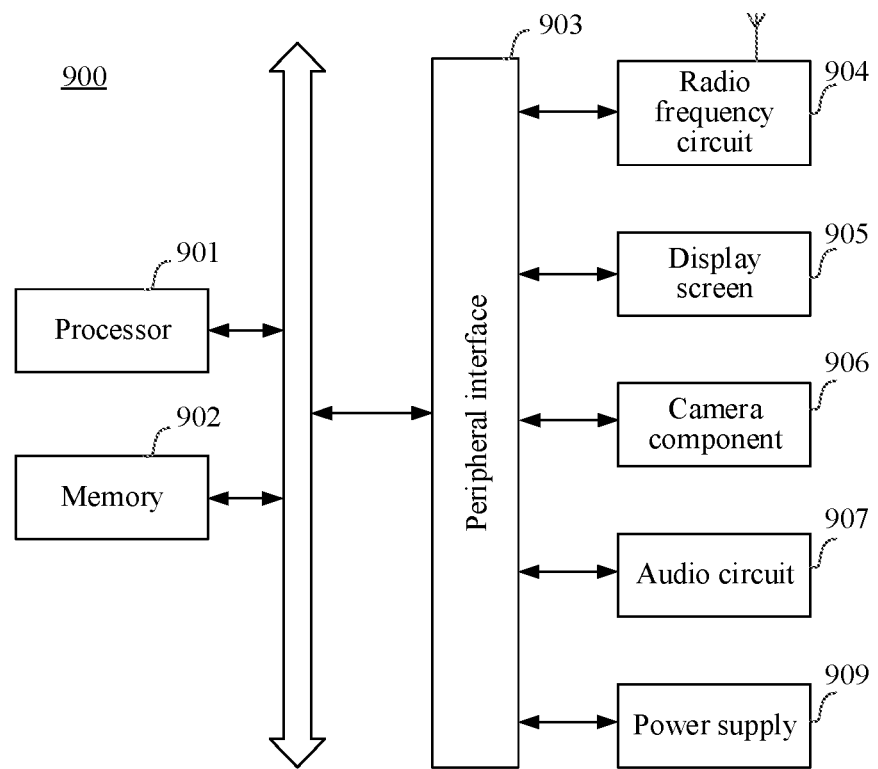
FIG. 9 is a schematic structural diagram of a terminal according to an embodiment of this application.

In some embodiments, the computer device is provided as a terminal. FIG. 9 is a schematic structural diagram of a terminal 900 according to an embodiment of this application. The terminal 900 includes: a processor 901 and a memory 902.

The processor 901 may include one or more processing cores, such as a 4-core processor or an 8-core processor. The processor 901 may also include a main processor and a co-processor. The main processor is a processor for processing data in a wake-up state, also referred to as a central processing unit (CPU). The coprocessor is a low power consumption processor configured to process data in a standby state. In some embodiments, the processor 901 may be integrated with a graphics processing unit (GPU). The GPU is configured to render and draw content that needs to be displayed on a display screen.

The memory 902 may include one or more computer-readable storage media, which may be non-transitory. In some embodiments, the non-transient computer-readable storage medium in the memory 902 is configured to store at least one computer program, and the at least one computer program is configured to be executed by the processor 901 to implement the group type identification method provided in the method embodiments of this application.

In some embodiments, the terminal 900 may include a peripheral interface 903 and at least one peripheral. The processor 901, the memory 902 and the peripheral interface 903 may be connected by a bus or a signal line. Each peripheral may be connected to the peripheral interface 903 by a bus, signal line, or a circuit board. Specifically, the peripheral includes at least one of a radio frequency circuit 904, a display screen 905, a camera assembly 906, an audio circuit 907, and a power supply 908.

The peripheral interface 903 may be configured to connect at least one input/output (I/O)-related peripheral to the processor 901 and the memory 902. In some embodiments, the processor 901, the memory 902, and the peripheral interface 903 are integrated on the same chip or the same circuit board. In some other embodiments, any one or two of the processor 901, the memory 902 and the peripheral interface 903 may be implemented on a separate chip or circuit board, which is not limited by this embodiment.

The RF circuit 904 is configured to receive and transmit RF signals, also referred to as electromagnetic signals. The RF circuit 904 communicates with a communication network and other communication devices through the electromagnetic signals. The RF circuit 904 converts electrical signals into electromagnetic signals for transmission, or converts received electromagnetic signals into electrical signals.

The display screen 905 is configured to display a user interface (UI). The UI may include a graph, a text, an icon, a video, and any combination thereof. When the display screen 905 is a touch display screen, the display screen 905 also has the ability to collect a touch signal at or above the surface of the display screen 905. The touch signal may be input, as a control signal, to the processor 901 for processing.

The camera assembly 906 is configured to capture images or video. In some embodiments, the camera assembly 906 includes a front camera and a rear camera.

The audio circuit 907 may include a microphone and a speaker. The microphone is configured to collect sound waves from a user and an environment and convert the sound waves into electrical signals that are input to the processor 901 for processing or to the RF circuit 904 for voice communication.

The power supply 908 is configured to power the various assemblies in the terminal 900. The power supply 908 may be AC, DC, disposable or rechargeable batteries.

It will be appreciated by those skilled in the art that the structure shown in FIG. 9 is not limiting of the terminal 900 and may include more or fewer assemblies than illustrated, or some assemblies may be combined, or different assembly arrangements may be employed.

Figure 10:
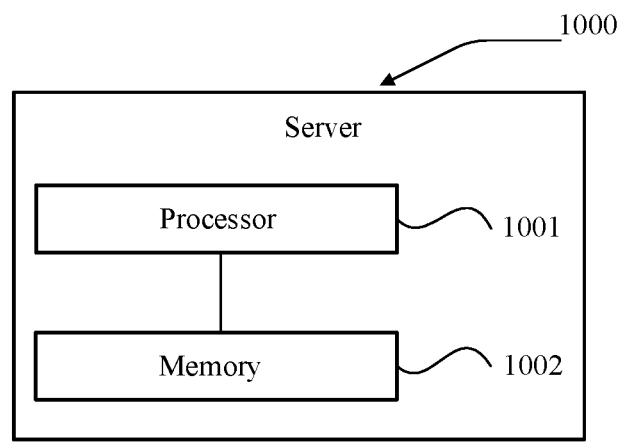
FIG. 10 is a schematic structural diagram of a server according to an embodiment of this application.

In some embodiments, the computer device is provided as a server. FIG. 10 is a schematic structural diagram of a server according to an embodiment of this application. The server 1000 may vary greatly due to different configurations or performance, and may include one or more processors (such as CPUs) 1001 and one or more memories 1002. The memory 1002 stores at least one computer program, the at least one computer program being loaded and executed by the processor 1001 to implement the methods provided in the foregoing method embodiments. Certainly, the device can also have a wired or wireless network interface, a keyboard, an I/O interface and other components to facilitate I/O. The device can also include other components for implementing device functions. Details are not described herein again.

The embodiments of this application further provide a computer-readable storage medium, storing at least one computer program, and the at least one computer program being loaded and executed by the processor to implement the following operations:

acquiring a first graph structure feature of a first target graph and first user features of a plurality of first user nodes in the first target graph, the first user node being a node corresponding to a user identifier in a target group, and the first target graph being constructed according to association relationships between the plurality of first user nodes;

acquiring an attention parameter of each first user node based on the first graph structure feature and the plurality of first user features, the attention parameter representing importance of the first user node in the first target graph;

selecting a plurality of second user nodes from the plurality of first user nodes, attention parameters of the plurality of second user nodes being greater than an attention parameter of an unselected first user node; and identifying a group type of the target group based on first user features of the plurality of second user nodes and a second graph structure feature of a second target graph, the second target graph being constructed according to association relationships between the plurality of second user nodes.

In an implementation, the at least one computer program is loaded and executed by the processor, so as to implement the following operations:

adjusting the first user features of the plurality of second user nodes based on the second graph structure feature to obtain second user features of the plurality of second user nodes;

acquiring an attention parameter of each second user node based on the second graph structure feature and the plurality of second user features; and selecting a plurality of third user nodes from the plurality of second user nodes, attention parameters of the plurality of third user nodes being greater than an attention parameter of an unselected second user node.

In an implementation, the at least one computer program is loaded and executed by the processor, so as to implement the following operations:

identifying the group type of the target group based on the first user features of the plurality of second user nodes, the second graph structure feature, second user features of the plurality of third user nodes, and a third graph structure feature of a third target graph, the third target graph being constructed according to association relationships between the plurality of third user nodes.

In an implementation, the at least one computer program is loaded and executed by the processor, so as to implement the following operations:

fusing the first user features of the plurality of second user nodes with the second graph structure features to obtain a first fusion feature;

fusing the second user features of the plurality of third user nodes with the third graph structure features to obtain a second fusion feature; and identifying the group type of the target group based on the first fusion feature and the second fusion feature.

In an implementation, the at least one computer program is loaded and executed by the processor, so as to implement the following operations: calculating an average value based on the first user features of the plurality of second user nodes and the second graph structure feature, to obtain an average user feature; and splicing the average user feature and a maximum user feature of the first user features of the plurality of second user nodes to obtain the first fusion feature.

In an implementation, the at least one computer program is loaded and executed by the processor, so as to implement the following operations:

splicing the first fusion feature and the second fusion feature to obtain a splicing feature corresponding to the target group; and identifying the group type of the target group based on the splicing feature.

In an implementation, the group type identification model includes a first attention network, a first screening network, and an identification network, and the at least one computer program is loaded and executed by the processor, so as to implement the following operations:

invoking the first attention network to acquire the attention parameter of each first user node based on the first graph structure feature and the plurality of first user features;

the selecting a plurality of second user nodes from the plurality of first user nodes includes:

invoking the first screening network to select the plurality of second user nodes from the plurality of first user nodes; and the identifying a group type of the target group based on first user features of the plurality of second user nodes and a second graph structure feature of a second target graph includes:

invoking the identification network to identify the group type of the target group based on the first user features of the plurality of second user nodes and the second graph structure feature.

In an implementation, the group type identification model further includes a first convolutional network, a second attention network, and a second screening network, and the at least one computer program is loaded and executed by the processor, so as to implement the following operations:

invoking the first convolutional network to adjust the first user features of the plurality of second user nodes based on the second graph structure feature to obtain second user features of the plurality of second user nodes;

invoking the second attention network to acquire an attention parameter of each second user node based on the second graph structure feature and the plurality of second user features; and invoking the second screening network, to select a plurality of third user nodes from the plurality of second user nodes, attention parameters of the plurality of third user nodes being greater than an attention parameter of an unselected second user node.

In an implementation, the at least one computer program is loaded and executed by the processor, so as to implement the following operations:

invoking the identification network to identify the group type of the target group based on the first user features of the plurality of second user nodes, the second graph structure feature, second user features of the plurality of third user nodes, and a third graph structure feature of a third target graph, the third target graph being constructed according to association relationships between the plurality of third user nodes.

In an implementation, the group type identification model further includes a first fusion network and a second fusion network, and the at least one computer program is loaded and executed by the processor, so as to implement the following operations:

invoking the first fusion network to fuse the first user features of the plurality of second user nodes with the second graph structure features to obtain a first fusion feature;

invoking the second convergence network to fuse the second user features of the plurality of third user nodes with the third graph structure features to obtain a second fusion feature; and invoking the identification network to identify the group type of the target group based on the first fusion feature and the second fusion feature.

In an implementation, the group type identification model further includes a splicing network, and the at least one computer program is loaded and executed by the processor, so as to implement the following operations:

invoking the splicing network to splice the first fusion feature and the second fusion feature to obtain a splicing feature corresponding to the target group; and invoking the identification network to identify the group type of the target group based on the splicing feature.

In an implementation, the at least one computer program is loaded and executed by the processor, so as to implement the following operations:

acquiring a sample type of a sample group, a sample graph structure feature of a sample graph, and sample user features of a plurality of sample user nodes in a sample target graph, the sample user node being a node corresponding to a sample user identifier, and the sample graph being constructed according to association relationships between a plurality of sample user identifiers in the sample group;

invoking the group type identification model to identify a prediction type of the sample group based on the sample graph structure feature and the sample user features of the plurality of sample user nodes; and training the group type identification model according to a difference between the sample type and the prediction type.

In an implementation, the graph structure feature includes an association degree between any two of the plurality of user nodes, and the at least one computer program is loaded and executed by the processor, so as to implement the following operations:

acquiring a quantity of times that any two user identifiers in the target group appear together, the quantity of times of co-appearance being a quantity of times that content is jointly published in the target group based on the any two user identifiers in a plurality of reference time periods; and determining an association degree between the any two user identifiers based on the quantity of times of co-appearance, the association degree being in a positive correlation with the quantity of times of co-appearance.

In an implementation, the at least one computer program is loaded and executed by the processor, so as to implement the following operations:

multiplying a quantity of the plurality of first user nodes by a reference ratio to obtain a reference quantity; and arranging attention parameters of the plurality of first user nodes in descending order, selecting a reference quantity of attention parameters that are arranged in the front, and using first user nodes corresponding to the selected attention parameters as the second user nodes.

In an implementation, the user feature includes a user behavior feature and a user attribute feature, and the at least one computer program is loaded and executed by the processor, so as to implement the following operations:

acquiring a user social network, the user social network including a plurality of registered user identifiers;

acquiring user behavior features of the plurality of user identifiers according to the user social network; and acquiring user attribute features of the plurality of user identifiers according to user portrait information corresponding to the plurality of user identifiers.

An embodiment of this application further provides a computer program product or a computer program. The computer program product or the computer program stores computer program code, the computer program code being stored in a computer-readable storage medium. A processor of a computer device reads the computer program code from the computer-readable storage medium, and the processor executes the computer program code, to cause the computer device to implement operations performed in the group type identification method according to the foregoing embodiments.

A person of ordinary skill in the art understands that all or part of the operations of the embodiments may be implemented by hardware or a program instructing related hardware. The program may be stored in a computer-readable storage medium. The storage medium may be a read-only memory, a magnetic disk, an optical disk, or the like.

It can be understood that, in specific implementations of this application, related data such as a user identifier, user behavior, and user attribute data is involved. When the foregoing embodiments of this application are applied to a specific product or technology, a user permission or consent needs to be obtained, and related data collection, use, and processing need to comply with relevant laws and standards of a relevant country and region.

The foregoing descriptions are merely embodiments of the embodiments of this application, but are not intended to limit the embodiments of this application. Any modification, equivalent replacement, or improvement made within the spirit and principle of the embodiments of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A group type identification method performed by a computer device and the method comprising:

acquiring a first graph structure feature of a first target graph and first user features of a plurality of first user nodes in the first target graph, the first user node being a node corresponding to a user identifier in a target group, and the first target graph being constructed according to association relationships between the plurality of first user nodes;

acquiring an attention parameter of each first user node based on the first graph structure feature and the plurality of first user features, the attention parameter representing importance of the first user node in the first target graph;

selecting a plurality of second user nodes from the plurality of first user nodes, attention parameters of the plurality of second user nodes being greater than an attention parameter of an unselected first user node; and identifying a group type of the target group based on first user features of the plurality of second user nodes and a second graph structure feature of a second target graph, the second target graph being constructed according to association relationships between the plurality of second user nodes.

2. The method according to claim 1, wherein after the selecting a plurality of second user nodes from the plurality of first user nodes, the method further comprises:

adjusting the first user features of the plurality of second user nodes based on the second graph structure feature to obtain second user features of the plurality of second user nodes;

acquiring an attention parameter of each second user node based on the second graph structure feature and the plurality of second user features; and selecting a plurality of third user nodes from the plurality of second user nodes, attention parameters of the plurality of third user nodes being greater than an attention parameter of an unselected second user node.

3. The method according to claim 2, wherein the identifying a group type of the target group based on first user features of the plurality of second user nodes and a second graph structure feature of a second target graph comprises:

identifying the group type of the target group based on the first user features of the plurality of second user nodes, the second graph structure feature, second user features of the plurality of third user nodes, and a third graph structure feature of a third target graph, the third target graph being constructed according to association relationships between the plurality of third user nodes.

4. The method according to claim 1, wherein a group type identification model comprises a first attention network, a first screening network, and an identification network, and the acquiring an attention parameter of each first user node based on the first graph structure feature and the plurality of first user features comprises:

invoking the first attention network to acquire the attention parameter of each first user node based on the first graph structure feature and the plurality of first user features;

the selecting a plurality of second user nodes from the plurality of first user nodes comprises:

invoking the first screening network to select the plurality of second user nodes from the plurality of first user nodes; and the identifying a group type of the target group based on first user features of the plurality of second user nodes and a second graph structure feature of a second target graph comprises:

invoking the identification network to identify the group type of the target group based on the first user features of the plurality of second user nodes and the second graph structure feature.

5. The method according to claim 1, wherein the graph structure feature comprises an association degree between any two of the plurality of user nodes, and the acquiring a graph structure feature of a first target graph comprises:

acquiring a quantity of times that any two user identifiers in the target group appear together, the quantity of times of co-appearance being a quantity of times that content is jointly published in the target group based on the any two user identifiers in a plurality of reference time periods; and determining an association degree between the any two user identifiers based on the quantity of times of co-appearance, the association degree being in a positive correlation with the quantity of times of co-appearance.

6. The method according to claim 1, wherein the selecting a plurality of second user nodes from the plurality of first user nodes comprises:

multiplying a quantity of the plurality of first user nodes by a reference ratio to obtain a reference quantity; and arranging attention parameters of the plurality of first user nodes in descending order, selecting a reference quantity of attention parameters that are arranged in the front, and using first user nodes corresponding to the selected attention parameters as the second user nodes.

7. The method according to claim 1, wherein the user feature comprises a user behavior feature and a user attribute feature, and the acquiring first user features of a plurality of first user nodes in the first target graph comprises:

acquiring a user social network, the user social network comprising a plurality of registered user identifiers;

acquiring user behavior features of the plurality of user identifiers according to the user social network; and acquiring user attribute features of the plurality of user identifiers according to user portrait information corresponding to the plurality of user identifiers.

8. A computer device, comprising: a processor and a memory, the memory storing at least one computer program, and the at least one computer program being loaded and executed by the processor and causing the computer device to implement a group type identification method comprising:

acquiring a first graph structure feature of a first target graph and first user features of a plurality of first user nodes in the first target graph, the first user node being a node corresponding to a user identifier in a target group, and the first target graph being constructed according to association relationships between the plurality of first user nodes;

acquiring an attention parameter of each first user node based on the first graph structure feature and the plurality of first user features, the attention parameter representing importance of the first user node in the first target graph;

selecting a plurality of second user nodes from the plurality of first user nodes, attention parameters of the plurality of second user nodes being greater than an attention parameter of an unselected first user node; and identifying a group type of the target group based on first user features of the plurality of second user nodes and a second graph structure feature of a second target graph, the second target graph being constructed according to association relationships between the plurality of second user nodes.

9. The computer device according to claim 8, wherein after the selecting a plurality of second user nodes from the plurality of first user nodes, the method further comprises:

adjusting the first user features of the plurality of second user nodes based on the second graph structure feature to obtain second user features of the plurality of second user nodes;

acquiring an attention parameter of each second user node based on the second graph structure feature and the plurality of second user features; and selecting a plurality of third user nodes from the plurality of second user nodes, attention parameters of the plurality of third user nodes being greater than an attention parameter of an unselected second user node.

10. The computer device according to claim 9, wherein the identifying a group type of the target group based on first user features of the plurality of second user nodes and a second graph structure feature of a second target graph comprises:

identifying the group type of the target group based on the first user features of the plurality of second user nodes, the second graph structure feature, second user features of the plurality of third user nodes, and a third graph structure feature of a third target graph, the third target graph being constructed according to association relationships between the plurality of third user nodes.

11. The computer device according to claim 8, wherein a group type identification model comprises a first attention network, a first screening network, and an identification network, and the acquiring an attention parameter of each first user node based on the first graph structure feature and the plurality of first user features comprises:

invoking the first attention network to acquire the attention parameter of each first user node based on the first graph structure feature and the plurality of first user features;

the selecting a plurality of second user nodes from the plurality of first user nodes comprises:

invoking the first screening network to select the plurality of second user nodes from the plurality of first user nodes; and the identifying a group type of the target group based on first user features of the plurality of second user nodes and a second graph structure feature of a second target graph comprises:

invoking the identification network to identify the group type of the target group based on the first user features of the plurality of second user nodes and the second graph structure feature.

12. The computer device according to claim 8, wherein the graph structure feature comprises an association degree between any two of the plurality of user nodes, and the acquiring a graph structure feature of a first target graph comprises:
  acquiring a quantity of times that any two user identifiers in the target group appear together, the quantity of times of co-appearance being a quantity of times that content is jointly published in the target group based on the any two user identifiers in a plurality of reference time periods; and
  determining an association degree between the any two user identifiers based on the quantity of times of co-appearance, the association degree being in a positive correlation with the quantity of times of co-appearance.

13. The computer device according to claim 8, wherein the selecting a plurality of second user nodes from the plurality of first user nodes comprises:
  multiplying a quantity of the plurality of first user nodes by a reference ratio to obtain a reference quantity; and
  arranging attention parameters of the plurality of first user nodes in descending order, selecting a reference quantity of attention parameters that are arranged in the front, and using first user nodes corresponding to the selected attention parameters as the second user nodes.

14. The computer device according to claim 8, wherein the user feature comprises a user behavior feature and a user attribute feature, and the acquiring first user features of a plurality of first user nodes in the first target graph comprises:
  acquiring a user social network, the user social network comprising a plurality of registered user identifiers;
  acquiring user behavior features of the plurality of user identifiers according to the user social network; and
  acquiring user attribute features of the plurality of user identifiers according to user portrait information corresponding to the plurality of user identifiers.

15. A non-transitory computer readable storage medium, storing at least one computer program, the at least one computer program being loaded and executed by a processor of a computer device and causing the computer device to implement a group type identification method comprising:
  acquiring a first graph structure feature of a first target graph and first user features of a plurality of first user nodes in the first target graph, the first user node being a node corresponding to a user identifier in a target group, and the first target graph being constructed according to association relationships between the plurality of first user nodes;
  acquiring an attention parameter of each first user node based on the first graph structure feature and the plurality of first user features, the attention parameter representing importance of the first user node in the first target graph;
  selecting a plurality of second user nodes from the plurality of first user nodes, attention parameters of the plurality of second user nodes being greater than an attention parameter of an unselected first user node; and
  identifying a group type of the target group based on first user features of the plurality of second user nodes and a second graph structure feature of a second target graph, the second target graph being constructed according to association relationships between the plurality of second user nodes.

16. The non-transitory computer readable storage medium according to claim 15, wherein after the selecting a plurality of second user nodes from the plurality of first user nodes, the method further comprises:
  adjusting the first user features of the plurality of second user nodes based on the second graph structure feature to obtain second user features of the plurality of second user nodes;
  acquiring an attention parameter of each second user node based on the second graph structure feature and the plurality of second user features; and
  selecting a plurality of third user nodes from the plurality of second user nodes, attention parameters of the plurality of third user nodes being greater than an attention parameter of an unselected second user node.

17. The non-transitory computer readable storage medium according to claim 15, wherein a group type identification model comprises a first attention network, a first screening network, and an identification network, and the acquiring an attention parameter of each first user node based on the first graph structure feature and the plurality of first user features comprises:
  invoking the first attention network to acquire the attention parameter of each first user node based on the first graph structure feature and the plurality of first user features;
  the selecting a plurality of second user nodes from the plurality of first user nodes comprises:
  invoking the first screening network to select the plurality of second user nodes from the plurality of first user nodes; and
  the identifying a group type of the target group based on first user features of the plurality of second user nodes and a second graph structure feature of a second target graph comprises:
  invoking the identification network to identify the group type of the target group based on the first user features of the plurality of second user nodes and the second graph structure feature.

18. The non-transitory computer readable storage medium according to claim 15, wherein the graph structure feature comprises an association degree between any two of the plurality of user nodes, and the acquiring a graph structure feature of a first target graph comprises:
  acquiring a quantity of times that any two user identifiers in the target group appear together, the quantity of times of co-appearance being a quantity of times that content is jointly published in the target group based on the any two user identifiers in a plurality of reference time periods; and
  determining an association degree between the any two user identifiers based on the quantity of times of co-appearance, the association degree being in a positive correlation with the quantity of times of co-appearance.

19. The non-transitory computer readable storage medium according to claim 15, wherein the selecting a plurality of second user nodes from the plurality of first user nodes comprises:
  multiplying a quantity of the plurality of first user nodes by a reference ratio to obtain a reference quantity; and
  arranging attention parameters of the plurality of first user nodes in descending order, selecting a reference quantity of attention parameters that are arranged in the front, and using first user nodes corresponding to the selected attention parameters as the second user nodes.

20. The non-transitory computer readable storage medium according to claim 15, wherein the user feature comprises a user behavior feature and a user attribute feature, and the acquiring first user features of a plurality of first user nodes in the first target graph comprises:

acquiring a user social network, the user social network comprising a plurality of registered user identifiers;

acquiring user behavior features of the plurality of user identifiers according to the user social network; and acquiring user attribute features of the plurality of user identifiers according to user portrait information corresponding to the plurality of user identifiers.

* * * * *